United States Patent
Wideman et al.

(10) Patent No.: US 6,660,791 B2
(45) Date of Patent: Dec. 9, 2003

(54) ARTICLE, INCLUDING TIRES, HAVING COMPONENT OF RUBBER COMPOSITION WHICH CONTAINS PARTICLES OF PRE-VULCANIZED RUBBER AND HIGH PURITY TRITHIODIPROPIONIC ACID

(75) Inventors: Lawson Gibson Wideman, Hudson, OH (US); George Frank Balogh, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 217 days.

(21) Appl. No.: 09/896,670

(22) Filed: Jun. 29, 2001

(65) Prior Publication Data

US 2003/0032685 A1 Feb. 13, 2003

(51) Int. Cl.$^7$ .............................. C08K 5/36; C08K 3/04; C08K 9/04

(52) U.S. Cl. ................ 524/303; 524/495; 524/526; 523/215; 525/332.6

(58) Field of Search .................. 521/43, 43.5; 523/215; 524/302, 495, 526, 303; 525/332.6

(56) References Cited

U.S. PATENT DOCUMENTS

| | | | |
|---|---|---|---|
| 5,087,668 A | 2/1992 | Standstrom | 525/237 |
| 5,130,363 A | 7/1992 | Scholl et al. | 524/392 |
| 5,605,951 A | 2/1997 | Sandstrom et al. | 524/494 |
| 5,733,963 A | 3/1998 | Sandstrom et al. | 524/492 |
| 5,883,139 A | 3/1999 | Wideman et al. | 521/43.5 |
| 6,077,874 A | 6/2000 | Wideman et al. | 521/42.5 |
| 6,230,777 B1 | 5/2001 | Hedlund et al. | 156/443 |

FOREIGN PATENT DOCUMENTS

EP 0 780 429 * 6/1997

* cited by examiner

*Primary Examiner*—Tae H. Yoon
(74) *Attorney, Agent, or Firm*—Henry C. Young, Jr.

(57) ABSTRACT

The invention relates to articles of manufacture, such as for example, tires and industrial products, which have at least one component comprised of a rubber composition which contains particles of pre-sulfur vulcanized rubber (e.g. ground recycled rubber) and high purity trithiodipropionic acid, wherein said trithiodipropionic acid is preferably provided as particles of a carbon black composite comprised of carbon black and said high purity trithiodipropionic acid. Said high purity trithiodipropionic acid is comprised of polythiodipropionic acids containing at least 80 weight percent trithiodipropionic acid based upon said polythiodipropionic acids.

8 Claims, No Drawings

ARTICLE, INCLUDING TIRES, HAVING COMPONENT OF RUBBER COMPOSITION WHICH CONTAINS PARTICLES OF PRE-VULCANIZED RUBBER AND HIGH PURITY TRITHIODIPROPIONIC ACID

FIELD OF THE INVENTION

The invention relates to articles of manufacture, such as for example, tires and industrial products, which have at least one component comprised of a rubber composition which contains particles of pre-sulfur vulcanized rubber (e.g. ground recycled rubber) and high purity trithiodipropionic acid, wherein said trithiodipropionic acid is preferably provided as particles of a carbon black composite comprised of carbon black and said high purity trithiodipropionic acid. Said high purity trithiodipropionic acid is comprised of polythiodipropionic acids containing at least 80 weight percent trithiodipropionic acid based upon said polythiodipropionic acids.

BACKGROUND OF THE INVENTION

Various manufactured articles, including for example, various tires and industrial products, have at least one component comprised of a sulfur vulcanized rubber. It is sometimes desired to blend relatively small amounts of particles of pre-vulcanized rubber with a rubber composition for one or more of such components followed by vulcanizing said rubber composition in a suitable mold. Said pre-vulcanized rubber is in a form of ground, recycled pre-vulcanized rubber obtained from, for example, various tires and industrial products. Scrap pneumatic tires may, for example, be used as a source of such pre-vulcanized rubber.

In practice, scrap vulcanized rubber may be prepared for recycling, for example, by depolymerizing it or otherwise changing its chemical character by various processes.

However, for the purposes of this invention, the scrap vulcanized rubber (the pre-vulcanized rubber) may be reclaimed by grinding it down to extremely small particles and mixing it as a compounding ingredient, usually as a filler, with other rubbers and rubber compounding ingredients to form a rubber composition followed by sulfur vulcanizing the resultant rubber composition. In this case, the recycled pre-vulcanized rubber remains vulcanized but is in a form of a fine, particulate pre-vulcanized rubber.

For the description of this invention, the terms "recycle" and "recycled rubber" are used somewhat interchangeably and are intended to relate to sulfur pre-vulcanized rubber compositions which have been ground into small particles unless otherwise designated.

Generally, such particulate recycled sulfur pre-vulcanized rubber is a complex mixture of largely unknown diene-based elastomers and various rubber compounding ingredients, and may contain a small quantity of textile fiber, and the like.

It has been observed that, after adding sulfur and accelerator to recycled sulfur pre-vulcanized rubber, followed by its revulcanization, the resulting physical properties, such as tensile and elongation, are usually lower than the corresponding properties of the original vulcanized rubber from which it was derived.

A process, for example, of improving properties of ground recycled sulfur vulcanized rubber through use of a tris (2-aminoethyl) amine has been disclosed as U.S. Pat. No. 6,077,874. U.S. Pat. No. 5,883,139 discloses the use of tetrathiodipropionic acid (which may be referred to herein as S4) to improve properties of rubber compositions which contain particles of ground recycle, sulfur cured diene-based rubber while the use of dithiodipropionic acid (S2) is not seen to improve the properties of rubber compositions which contain particles of ground recycle, sulfur cured diene-based rubber. Therefore, it is considered herein that it would not be obvious to one having skill in such art to successfully use a high purity trithiodipropionic acid (S3) to improve the properties of rubber compositions which contain particles of ground recycle sulfur cured, diene-based rubber.

For the purposes of this invention, such high purity trithiodipropionic acid (S3) is a blend of polythiodipropionic acids which contains at least 80, and preferably a range of from 80 to about 90, weight percent 3,3'-trithiodipropionic acid weight of such acid, based upon said polythiodipropionic acids, with the remainder comprised of other polythiodipropionic acids which are primarily said S4 and S2.

In the description of this invention, the term "phr" relates to parts by weight in a rubber composition of an ingredient therein per 100 parts of elastomer. The terms "rubber" and "elastomer" may be used interchangeably unless otherwise indicated. The terms "rubber composition" and "compound" may be use interchangeably unless otherwise indicated. The terms "vulcanize" and "cure" may also be used interchangeably unless otherwise indicated.

SUMMARY OF THE INVENTION

The present invention relates to a process for improving the properties of ground recycled sulfur-vulcanized rubber and particularly improving sulfur curable diene-based rubber compositions which contain particulate pre-sulfur vulcanized diene-based rubber.

DETAILED DESCRIPTION OF THE INVENTION

In accordance with this invention, a process of preparing sulfur vulcanizable rubber composition which comprises:

A. preparing a pre-blend by homogeneously blending
   1. particles of a sulfur vulcanized, diene-based rubber composition, together with
   2. high purity trithiodipropionic acid and particles of carbon black; or
   3. particles of a carbon black composite comprised of carbon black and high purity trithiodipropionic acid, having a weight ratio of said high purity trithiodipropionic acid to carbon black in a range of from about 1/10 to about 10/1;

wherein said high purity trithiodipropionic acid having the general Formula (I):

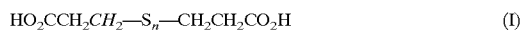

$$HO_2CCH_2CH_2-S_n-CH_2CH_2CO_2H \qquad (I)$$

wherein n is a value of from 2 to about 5 and wherein at least 80 percent, and preferably from about 80 to about 90 percent, of n is 3, wherein about 0.18 to about 10, alternately from 1 to about 5, parts by weight of trithiodipropionic acid is thereby provided per 100 parts by weight of diene-based rubber contained in said sulfur vulcanizable rubber composition, and wherein said particles of sulfur vulcanized rubber composition is of a particle size of less than 420 microns;

(B) mixing about one to about 40, alternately about 15 to about 20, parts by weight of said pre-blend with 100 parts by weight of at least one unvulcanized hydrocarbon diene-based, sulfur vulcanizable rubber to form a rubber composition comprised of said unvulcanized rubber and said pre-blend.

Accordingly, in practice, the high purity trithiodipropionic acid may be added directly to the particulate pre-vulcanized rubber or as said carbon black composite.

In further accordance with this invention, a rubber composition is provided which is comprised of said pre-blend and said unvulcanized rubber.

In additional accordance with this invention, sulfur (referred to herein as free sulfur) is blended with said rubber composition in an amount in a range of about 1 to about 5 parts by weight thereof per 100 parts by weight of said unvulcanized diene-based rubber (usually together with conventional sulfur cure accelerators and other conventional rubber compounding ingredients in conventional amounts) to form a free sulfur-containing rubber composition.

In further accordance with this invention, said free sulfur-containing rubber composition is sulfur vulcanized in a suitable mold under conditions of elevated temperature (e.g. in a range of about 140° C. to about 180° C.) and pressure to form a sulfur vulcanized article of manufacture.

In further accordance with this invention a sulfur vulcanized, pre-vulcanized rubber-containing, rubber composition is provided.

In additional accordance with this invention, an article of manufacture is provided which contains at least one component of a said sulfur vulcanized, pre-vulcanized rubber-containing, rubber composition.

In further accordance with this invention, a tire is provided which contains at least one component of a rubber composition comprised of said sulfur vulcanized, pre-vulcanized rubber-containing, rubber composition.

In additional accordance with this invention, a tire is provided having a tread of a rubber composition which is comprised of said sulfur vulcanized, pre-vulcanized rubber-containing, rubber composition.

It is considered herein to be significant that a high purity trithiodipropionic acid (S3) be used for this invention in order to minimize the amount of dithiodipropionic acid (S2) which is considered herein to be ineffective insofar as treating the pre-vulcanized rubber particles is concerning and thereby in a nature as a diluent material in the trithiodipropionic acid (S3).

Such high purity trithiodipropionic acid may conveniently be prepared or obtained, for example, by reacting sulfur dichloride (SCl$_2$) of technical grade purity (ca at least 80 percent) to react with 3-mercaptopropionic acid in toluene solution in a suitable container with coolant being applied to the exterior of the container while the reaction proceeds.

In practice, the high purity trithiodipropionic acid, is in a form of a mixture of polythiodipropionic acids which contains at least 80, preferably at least 85, and alternately in a range of about 80 to about 90 weight percent of said trithiodipropionic acid, with a maximum of 20 weight percent dithiopropionic acid and a maximum of 20, preferably a maximum of 10, weight percent tetrathiopropionic acid in the polythiodipropionic acid mixture.

In practice, as hereinbefore related, said particulate, sulfur pre-vulcanized rubber composition should have a maximum particle size of about 420 microns in diameter. It is considered herein that particles greater than such size are of a size which is believed to be relatively impractical for subsequent mixing with the treated vulcanized rubber/unvulcanized rubber because of an expected rubber viscosity build-up in rubber processing equipment. In general, it is considered herein that the sulfur pre-vulcanized rubber particles should more preferably have a maximum particle size of about 250 microns (60 mesh) and even more preferably less than about 177 microns (80 mesh). Preferably, such particles range from about 250 microns down to about 74 microns in diameter.

The use of the high purity trithiodipropionic acid alone or particularly as a component of the pre-formed carbon black composite is considered herein to be beneficial by providing the high purity trithiodipropionic acid as being bound in a highly dispersed form on the carbon black and to thereby enhance a relatively strong and efficient interaction with the particulate, sulfur-vulcanized rubber with which it is blended.

Use of a composite blending procedure (forming a composite of carbon black and high purity trithiodipropionic acid) with the recycle sulfur pre-vulcanized rubber is considered herein to be particularly advantageous as an alternative to use of a volatile organic solvent carrier for the high purity trithiodipropionic acid for other various reasons, such as, for example, safety and environmental considerations.

Representative of various particulate carbon blacks for preparation of said carbon black composite are, for example, conventional rubber reinforcing carbon blacks with ASTM numbered designations ranging from N110 to N991 which can be readily referenced, for example, in the 1990, 13th edition, of *The Vanderbilt Rubber Handbook,* Pages 417 and 418.

The composite of carbon black and high purity trithiodipropionic acid may be suitably prepared, for example, by highly dispersing the high purity trithiodipropionic acid onto the surface of the carbon black to thereby maximize the interaction of the trithiodipropionic with the surface of the carbon black.

The dispersing of the high purity trithiodipropionic acid onto the carbon black surface may be accomplished by, for example, by use of a volatile organic solvent which can readily be removed by evaporation, or by spraying or atomizing the trithiodipropionic acid onto the surface of the carbon black.

In the practice of this invention, the high purity trithiodipropionic acid alone or as a carbon black composite is dispersed in the particulate sulfur pre-vulcanized rubber in a manner that the trithiodipropionic acid itself is dispersed in the pre-vulcanized rubber in an amount ranging from 0.18 to 10.0 phr of the trithiodipropionic acid. Preferably, the level of trithiodipropionic acid that is dispersed ranges from 0.36 to 5.0 phr, based upon the pre-vulcanized rubber.

For the purpose of the description of this invention, the particulate sulfur pre-vulcanized rubber having been treated, or blended, with the composite of the dispersed trithiodipropionic acid on carbon black may sometimes be referred to herein as "treated sulfur-vulcanized rubber" or "treated recycled vulcanized rubber".

In the practice of this invention, the blend of particles of carbon black composite sulfur pre-vulcanized rubber may be mixed with unvulcanized rubber, particularly unvulcanized diene-based elastomers. For such practice, as hereinbefore from about one to about 40 parts by weight of said particulate blend may be mixed with 100 parts by weight of at least one unvulcanized rubber to form the resulting rubber composition. Preferably, from 2 to 30 parts by weight of said particulate blend is mixed with 100 parts by weight of at least one unvulcanized rubber.

Representative examples of such unvulcanized rubber, or elastomer, are, for example, diene-based elastomers as homopolymers and copolymers of conjugated diene hydrocarbons such as, for example isoprene and 1,3-butadiene and copolymers of conjugated diene hydrocarbons with an aromatic vinyl compound such as styrene and alphamethhyl styrene, preferably styrene.

Representative of such elastomers are, for example, cis 1,4-polyisoprene (natural and synthetic), 1,4-cis-polybutadiene, butadiene/styrene copolymers, isoprene/butadiene copolymers, styrene/isoprene/butadiene terpolymers, and mixtures thereof.

In one aspect at least two unvulcanized elastomers may be blended with said treated recycled rubber. Such elastomers may be, for example, a combination of cis 1,4-polyisoprene rubber (natural or synthetic, with natural rubber being preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The synthetic cis 1,4-polyisoprene and the natural cis 1,4-polyisoprene rubber are well known to those having skill in the rubber art.

As can be appreciated by one skilled in the art, any of the above recited unvulcanized rubbers may be the same kind or different kind of rubber that is found in the ground recycled rubber.

It is to be appreciated that, in order to cure the rubber composition of the present invention, a sulfur vulcanizing agent is used. Examples of various sulfur vulcanizing agents include, for example, elemental sulfur (free sulfur) or sulfur donating vulcanizing agents, for example, an amine disulfide, polymeric polysulfide or sulfur olefin adducts. Preferably, the sulfur vulcanizing agent is elemental sulfur. The amount of sulfur vulcanizing agent will vary depending on the type of rubber and the particular type of sulfur vulcanizing agent that is used. Generally speaking, the amount of sulfur vulcanizing agent ranges from about 0.1 to about 5 phr with a range of from about 0.5 to about 2 being preferred.

Conventional rubber additives may be incorporated in the rubber stock of the present invention. The additives commonly used in rubber stocks include fillers, plasticizers, waxes, processing oils, peptizers, retarders, antiozonants, antioxidants and the like. The total amount of filler that may be used may range from about 30 to about 150 phr, with a range of from about 45 to about 100 phr being preferred. Fillers include clays, calcium carbonate, calcium silicate, titanium dioxide and carbon black. Representative carbon blacks that are commonly used in rubber stocks include, for example, those with ASTM designations of N110, N121, N220, N231, N234, N242, N293, N299, S315, N326, N330, M332, N339, N343, N347, N351, N358, N375, N472, N539, N582, N630, N642, N660, N754, N762, N765, N774, N990 and N991. Plasticizers are conventionally used in amounts ranging from about 2 to about 50 phr with a range of about 5 to about 30 phr being preferred. The amount of plasticizer used will depend upon the softening effect desired. Examples of suitable plasticizers include aromatic extract oils, petroleum softeners including asphaltenes, pentachlorophenol, saturated and unsaturated hydrocarbons and nitrogen bases, coal tar products, cumarone-indene resins and esters such as dibutyl phthalate and tricresol phosphate. Typical peptizers may be, for example, pentachlorothiophenol and dibenzamidophenyl disulfide. Such peptizers are used in amounts ranging from 0.1 to 1 phr. Common waxes which may be used include paraffinic waxes and microcrystalline blends. Such waxes are used in amounts ranging from about 0.5 to 3 phr. Materials used in compounding which function as an accelerator-activator includes metal oxides such as zinc oxide and magnesium oxide which are used in conjunction with acidic materials such as fatty acid, for example, tall oil fatty acids, stearic acid, oleic acid and the like. The amount of the metal oxide may range from about 1 to about 14 phr with a range of from about 2 to about 8 phr being preferred. The amount of fatty acid which may be used may range from about 0 phr to about 5.0 phr with a range of from about 0 phr to about 2 phr being preferred.

Accelerators are used to control the time and/or temperature required for vulcanization and to improve the properties of the vulcanizate. In one embodiment, a single accelerator system may be used; i.e., primary accelerator. The primary accelerator(s) may be used in total amounts ranging from about 0.5 to about 4, preferably about 0.8 to about 2.0, phr. In another embodiment, combinations of a primary and a secondary accelerator might be used with the secondary accelerator being used in a smaller, equal or greater amount to the primary accelerator. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate, disulfide or thiuram compound.

The rubber compounds of the present invention may also contain a cure activator. A representative cure activator is methyl trialkyl (C8–C10) ammonium chloride commercially available under the trademark Adogeng® 464 from Sherex Chemical Company of Dublin, Ohio. The amount of activator may be used in a range of from 0.05 to 5 phr.

Siliceous pigments may be used in the rubber compound applications of the present invention, including pyrogenic and precipitated siliceous pigments (silica), although precipitated silicas are preferred. The siliceous pigments preferably employed in this invention are precipitated silicas such as, for example, those obtained by the acidification of a soluble silicate, e.g., sodium silicate. Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930). The silica may also be typically characterized by having a dibutyl phthalate (DBP) absorption value in a range of about 100 to about 400, and more usually about 150 to about 300 $cm^3/100$ g.

Various commercially available silicas may be considered for use in this invention such as, only for example herein, and without limitation, silicas commercially available from PPG Industries under the Hi-Sil trademark with designations 210, 243, etc; silicas available from Rhodia, with, for example, designations of Zeosil 1165MP and Zeosil 165GR and silicas available from Degussa AG with, for example, designations VN2 and VN3, 3370 etc. Generally speaking, the amount of silica may range from 5 to 120 phr. The amount of silica will generally range from about 5 to 120 phr. Preferably, the amount of silica will range from 10 to 30 phr.

A class of compounding materials known as scorch retarders are commonly used. Phthalic anhydride, salicylic acid, sodium acetate and N-cyclohexyl thiophthalimide are known retarders. Retarders are generally used in an amount ranging from about 0.1 to 0.5 phr.

Conventionally, antioxidants and sometimes antiozonants, hereinafter referred to as antidegradants, are added to rubber stocks. Representative antidegradants include monophenols, bisphenols, thiobisphenols, polyphenols, hydroquinone derivatives, phosphites, thioesters, naphthyl amines, diphenyl-p-phenylenediamines, diphenylamines and other diaryl amine derivatives, para-phenylenediamines, polymerized trimethyldihydroquinoline and mixtures thereof. Specific examples of such antidegradants are disclosed in *The Vanderbilt Rubber Handbook* (1990), Pages 282 through 286. Antidegradants are generally used in amounts from about 0.25 to about 5.0 phr with a range of from about 1.0 to about 3.0 phr being preferred.

The rubber compound of the present invention may be used as a wire coat or bead coat for use in a tire. For such purposes, cobalt compounds known in the art to promote the adhesion of rubber to metal may be blended with the rubber composition. Thus, suitable cobalt compounds which may be employed include cobalt salts of fatty acids such as stearic, palmitic, oleic, linoleic and the like; cobalt salts of aliphatic or alicyclic carboxylic acids having from 6 to 30 carbon atoms; cobalt chloride, cobalt naphthenate, cobalt neodecanoate, cobalt carboxylate and an organo-cobalt-boron complex commercially available under the designation Manobond C from Wyrough and Loser, Inc, Trenton, N.J.

Amounts of cobalt compound which may be employed depend upon the specific nature of the cobalt compound selected, particularly the amount of cobalt metal present in the compound. Since the amount of cobalt metal varies considerably in cobalt compounds which are suitable for use, it is most appropriate and convenient to base the amount of the cobalt compound utilized on the amount of cobalt metal desired in the finished stock composition.

The amount of the cobalt compound may range from about 0.1 to 2.0 phr. Preferably, the amount of cobalt compound may range from about 0.5 to 1.0 phr. When used, the amount of cobalt compound present in the stock composition should be sufficient to provide from about 0.01 percent to about 0.35 percent by weight of cobalt metal based upon total weight of the rubber stock composition with the preferred amounts being from about 0.03 percent to about 0.2 percent by weight of cobalt metal based on total weight of skim stock composition.

The sulfur vulcanizable rubber compound is conventionally cured at a temperature ranging, for example, from about 140° C. to 180° C.

The mixing of the rubber compound can be accomplished by methods known to those having skill in the rubber mixing art. For example, the ingredients are typically mixed in at least two stages, namely at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

Various articles of manufacture, including tires and industrial products, may contain at least one component comprised of a rubber composition of this invention. For example, the rubber composition of this invention may be used in forming a composite with reinforcing material such as in the manufacture of tires, belts or hoses. Preferably, the composition of the present invention is in the form of a tire and more specially as a component of a tire, including, for example, one or more of the tire's tread, wirecoat, beadcoat, sidewall, apex, chafer and plycoat.

The following Examples are presented to further illustrate, although they are not intended to be limiting. The parts and percentages are by weight unless otherwise indicated.

EXAMPLE I

A particulate carbon black composite composed of carbon black and high purity trithiodipropionic acid (S3) is prepared as follows:

To a one liter reactor was added 50 grams of a mixture of polythiodipropionic acids which contained about 85 weight percent 3,3'-trithiodipropionic acid and 50 milliliters of reagent grade acetone, followed by an addition of 50 grams of particulate N330 carbon black. The mixture was stirred for several minutes and the acetone then removed from the reactor by evaporation under sub-atmospheric pressure at about 23° C., or room temperature. The mixture was further dried in a vacuum oven at about 50° C. under a vacuum of about 29 inches of mercury for about 4 hours to yield a particulate carbon black composite of the high purity trithiodipropionic acid and carbon black in a form of free-flowing, gray-black colored, granules.

The resulting particulate (granular) carbon composite contained about 43 weight percent of trithiodipropionic acid itself based on the total weight of the carbon black composite.

EXAMPLE II

Four rubber formulations were prepared to compare and contrast a significance of two different levels of trithiodipropionic acid with ground recycled rubber and identified herein as Samples C and D, with Samples A and B being Control Samples.

Each rubber formulation contained 70 parts by weight of cis 1,4-polybutadiene rubber and 30 parts by weight styrene/butadiene rubber. Each rubber formulation also contained the same conventional amounts of processing oil, peptizer, fatty acids, antidegradants, waxes, zinc oxide, primary and secondary accelerators and sulfur. Each formulation differed by the additional ingredients listed in Table 1. The rubber formulations were prepared in a two-stage internal rubber mixing procedure, namely, by mixing the ingredients in an internal rubber mixer to a temperature of about 150° C., removing and cooling the mixture to below 40° C. and then mixing the sulfur and sulfur vulcanization accelerators therewith in an internal rubber mixture to a temperature of about 108° C.

Control Sample A was comprised of a rubber composition without any particulate pre-sulfur vulcanized rubber and without said particulate (granular) carbon black composite of carbon black and high purity trithiodipropionic acid prepared in Example I.

Control Sample B was comprised of a rubber composition which contained a particulate pre-sulfur vulcanized rubber composition (scrap rubber) but did not contain said particulate carbon black composite of carbon black and high purity trithiodipropionic acid prepared in Example I.

Sample C and Sample D contained both the particulate pre-sulfur vulcanized rubber composition (scrap rubber) and a sufficient amount of carbon black composite prepared by Example I to provide 0.5 and 1.5 parts by weight of trithiodipropionic acid per 100 parts of the added cis 1,4-polybutadiene rubber and styrene/butadiene rubber.

The additional ingredients for the rubber compositions are illustrated in the following Table 1.

TABLE 1

| Material | Parts | | | |
|---|---|---|---|---|
| | Sample A Control | Sample B Control | Sample C | Sample D |
| Non-Productive Mixing for about minutes to about 150° C. | | | | |
| Polybutadiene rubber[1] | 30 | 30 | 30 | 3 |
| Styrene/butadiene rubber[2] | 70 | 70 | 70 | 70 |
| Recycle rubber[3] | 0 | 20 | 20 | 20 |
| Trithiodipropionic acid[4] | 0 | 0 | 0.5 | 1.5 |

TABLE 1-continued

| Material | Parts | | | |
|---|---|---|---|---|
| | Sample A Control | Sample B Control | Sample C | Sample D |

[1]Cis 1,4-polybutadiene rubber obtained as Budene 1254 from The Goodyear Tire & Rubber Company as a rubber/oil mixture weight ratio of 30/7.5 and reported in Table 1 on a dry weight of rubber basis.
[2]Styrene/butadiene rubber having a styrene content of about 12 percent obtained as PLF 1712 from The Goodyear Tire & Rubber Company as a rubber/oil mixture weight ratio of 70/26.25 and reported in Table 1 on a dry weight of rubber basis.
[3]Ground, sulfur pre-vulcanized rubber having a particle size of about 80 mesh (e.g. about 180 microns) obtained as GF80 from the Rouse Company. The GF80 recycle rubber (particulate, ground sulfur vulcanized rubber) contained about 88 percent by weight of particles that pass through 100 mesh, 95 percent by weight of particles that pass through 80 mesh and 100 percent by weight of particles that pass through a 60 mesh screen. A thermal gravimetric analysis (TGA) analysis for the GF80 recycle rubber is about 14 percent by weight volatiles, about 7 percent ash, about 30 percent carbon black and 50 percent rubber.
[4]Particulate (granular) carbon black composite of N330 carbon black and high purity trithiodipropionic acid as prepared in Example I. The acid composition was composed of about 85 weight trithiodipropionic acid, about 10 weight percent dithiodipropionic acid and about 5 weight percent of tetrathiodipropionic acid. The trithiodipropionic acid is reported in Table 1 in terms of parts by weight of the composite provided per 100 parts by weight of the added polybutadiene and styrene/butadiene rubbers reported in Table 1.

EXAMPLE III

The Samples A through D were cured at a temperature of about 150° C. and the resulting cure properties of the Samples reported in the following Table 2 were determined using a Monsanto oscillating disc rheometer which was operated at a temperature of 150° C. and 100 cycles per minute. A description of oscillating disc rheometers can be found in *The Vanderbilt Rubber Handbook,* edited by Robert O. Ohm (Norwalk, Conn., R.T. Vanderbilt Company, Inc., 1990), Pages 554 through 557. The use of this cure meter and standardized values read from the curve are specified in ASTM D-2084. A typical cure curve obtained on an oscillating disc rheometer is shown on Page 555 of the 1990 edition of *The Vanderbilt Rubber Handbook.*

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are considered herein as being significant since changes in the rubber by varying the ingredients are very readily observed. It is considered herein that it is normally desirable and advantageous for the rubber composition to exhibit a relatively a fast rate of vulcanization.

The following Table 2 reports cure properties there were determined from cure curves that were obtained for the rubber stocks that were prepared as Samples A–D of Example II. These properties include a torque minimum, a torque maximum, the differences between maximum torque and minimum torque (delta torque), final torque minutes to 1 percent of the torque increase (t1), minutes to 25 percent of the torque increase (T25), minutes to 50 percent of the torque increase (T50), minutes to 80 percent of the torque increase (T80) and minutes to 90 percent of the torque increase (T90).

The term "ODR" relates to the test instrument used for obtaining the cure behavior date, namely a commercially available Oscillating Disk Rheometer.

TABLE 2

| ODR (Temp 150° C.) | Control Sample A Without GF80 | Control Sample B With GF80 | Sample C With GF80 0.5 Parts S3 | Sample D With GF80 1.5 Parts S3 |
|---|---|---|---|---|
| Minimum torque (MPa) | 10.27 | 10.41 | 11.42 | 11.51 |
| Maximum torque (MPa) | 36.52 | 32.86 | 37.08 | 38.66 |
| Delta torque | 26.25 | 22.45 | 25.65 | 27.15 |
| Final torque (MPa) | 36.09 | 32.55 | 36.95 | 38.58 |
| T (1) | 5.38 | 5.28 | 5.73 | 5.26 |
| T 25 | 7.13 | 6.88 | 7.8 | 7.51 |
| T 50 | 8.21 | 8.11 | 9.5 | 9.66 |
| T 80 | 10.93 | 11.1 | 13.93 | 15.3 |
| T 90 | 13.68 | 13.98 | 18.2 | 20.36 |
| 100% modulus (MPa) | 1.73 | 1.56 | 1.76 | 1.93 |
| 300% modulus (MPa) | 8.62 | 6.94 | 7.77 | 8.62 |
| Tensile strength (MPa) | 15.75 | 14.27 | 14.27 | 13.66 |
| Elongation (%) | 488 | 518 | 491 | 449 |
| Shore A Hardness | | | | |
| 23° C. | 62.7 | 61.4 | 64.7 | 66.4 |
| 100° C. | 53.5 | 51.3 | 53.8 | 55.4 |
| Rebound | | | | |
| 23° C. | 40 | 40.3 | 42.6 | 42.7 |
| 100° C. | 55.1 | 52.5 | 53.5 | 53.9 |
| Peel adhesion (MPa?) | 67 | 82 | 69 | 59 |
| Dispergrader white area | 4.2 | 7.3 | 9.6 | 9.9 |
| DIN abrasion (cm³ loss) | 90 | 93 | 95 | 98 |
| Mooney (ML 1 + 4) | 76 | 82 | 86 | 86 |

From Table 2, it can be seen from properties of Control Sample B that the addition of 20 parts of GF 80 recycle rubber to Sample A significantly degraded the stiffness, hardness, delta torque and 100 percent and 300 percent modulus properties of the rubber composition. This reduction in such properties is considered herein to be significant because various components of tires, such as for example treads, normally upon one or more of such physical properties for maintaining their durability, particularly under working conditions.

From Table 2, it can be seen from the properties of Sample C and Sample D that the addition of from 0.5 to 1.5 parts of the thiodipropionic acid to the composition Sample B which contained the GF 80 pre-vulcanized rubber additive (recycle rubber) resulted in the Samples regaining, or substantially maintaining, the aforesaid physical properties of Control Sample A such as stiffness, delta torque and 100 percent and 300 percent modulii. This is considered herein to be important because of the aforesaid significance of such physical properties.

Accordingly, the rubber composition which contains a particulate sulfur pre-vulcanized rubber additive (recycle rubber) in combination with the trithiodipropionic acid is therefore considered herein to be novel and inventive because apparently a strong interaction between recycle rubber and the carbon black composite of carbon black and trithiodipropionic acid resulted in a rubber composition with retained physical properties, such as delta torque for the state of cure, as well as modulus and hardness.

While certain representative embodiments and details have been shown for the purpose of illustrating the invention, it will be apparent to those skilled in this art that various changes and modifications may be made therein without departing from the spirit or scope of the invention.

What is claimed is:

1. A process of preparing a sulfur vulcanized rubber composition which comprises:

A. preparing a pre-blend by homogeneously blending
   1. particles of a sulfur vulcanized, diene-based rubber composition, together with
   2. high purity trithiodipropionic acid and particles of carbon black, or
   3. particles of a carbon black composite comprised of carbon black and high purity trithiodipropionic acid, having a weight ratio of said high purity trithiodipropionic acid to carbon black in a range of from about 1/10 to about 10/1 and wherein said high purity trithiodipropionic acid having the general Formula (I):

$$HO_2CCH_2CH_2-S_n-CH_2CH_2CO_2H \qquad (I)$$

wherein n is a value of from 2 to about 5 and wherein at least 80 percent of n is 3 and wherein said high purity trithiodipropionic acid is a blend of polythiodipropionic acids comprised of from 80 to about 90 weight percent of said trithiodipropionic acid, a maximum of 20 weight percent dithiopropionic acid and a maximum of 10 weight percent tetrathiopropionic acid, based on said polythiodipropionic acid blend;

wherein the amount of said carbon black composite is sufficient to provide from about 0.18 to about 10 parts by weight of trithiodipropionic acid per 100 parts by weight of diene-based rubber contained in said sulfur vulcanized rubber composition, and wherein said particles of sulfur vulcanized rubber composition is of a particle size of less than 420 microns;

B. mixing about one to about 40 parts by weight of said pre-blend with 100 parts by weight of at least one unvulcanized hydrocarbon diene-based, sulfur vulcanizable rubber to form a rubber composition comprised of said unvulcanized rubber and said pre-blend, and C. sulfur vulcanizing said rubber composition in a suitable mold at a temperature in a range of from about 140° C. to about 180° C., and wherein sulfur is A. mixed with said particulate pre-blend prior to blending thereof with said unvulcanized diene-based elastomer, or B. mixed with a combination of said particulate pre-blend and said unvulcanized diene-based rubber.

2. The process of claim 1 wherein about one to about 40 parts by weight of said particulate pre-blend is mixed with sulfur and 100 parts by weight of said unvulcanized hydrocarbon diene-based rubber.

3. A sulfur vulcanized rubber composition prepared by the process of claim 2.

4. An article of manufacture which contains at least one component of a sulfur vulcanized rubber composition of claim 3.

5. A tire which contains at least one component of a sulfur vulcanized rubber composition prepared according to the process of claim 1.

6. A tire which contains at least one component of a sulfur vulcanized rubber composition of claim 3.

7. A tire having a tread comprised of a sulfur vulcanized rubber composition prepared by the process of claim 1.

8. A tire having a tread of a rubber composition comprised of the sulfur vulcanized rubber composition of claim 3.

* * * * *